Aug. 5, 1958  L. PÉRAS  2,845,668
PERMANENT MOLD HAVING A REMOVABLE CORE
Filed March 5, 1956
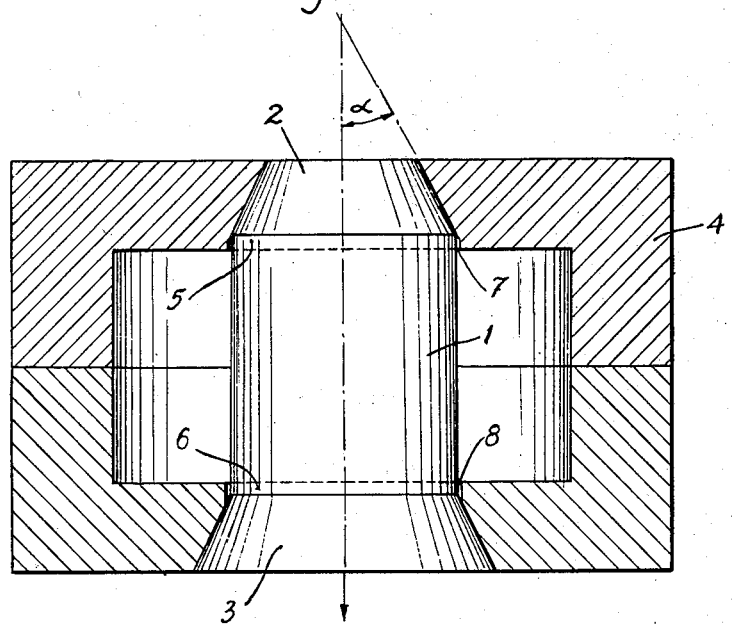
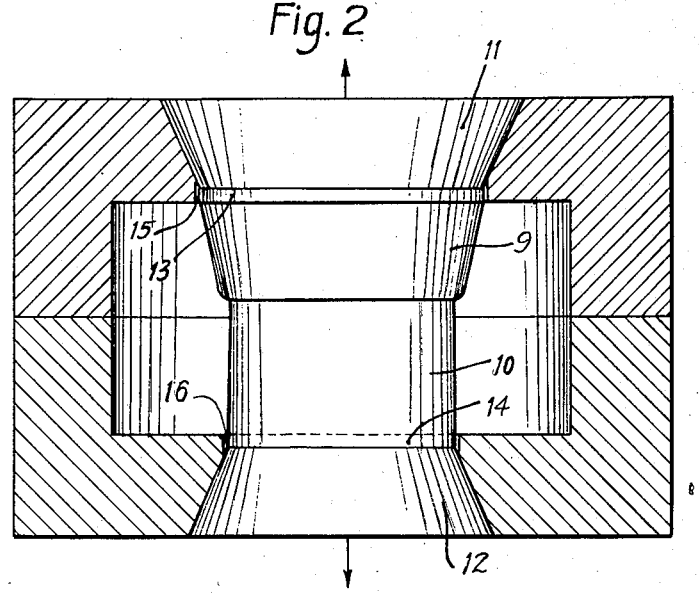

United States Patent Office 2,845,668
Patented Aug. 5, 1958

2,845,668

PERMANENT MOLD HAVING A REMOVABLE CORE

Lucien Péras, Billancourt, France, assignor to Regie Nationale des Usines Renault, Billancourt, and Societe des Hauts-Fourneaux et Forges d'Allevard, Paris, France, French works under the control and the authority of the French Government Application March 5, 1956, Serial No. 569,578

Claims priority, application France March 4, 1955

5 Claims. (Cl. 22—168)

In the field of pressure casting and moulding plastic materials, permanent cores are used which are capable of employment throughout a series of operations without being replaced or modified.

However, cores of this kind are expensive so that their use is limited by depreciation costs. It is therefore of primary importance to try and reduce as much as possible the wear to which these pieces are subjected.

This wear is the more noticeable the higher the temperatures and working pressures of the moulded materials. Passing successively from plastic materials to zinc alloys, light metals, cupreous metals, pig iron and steel, the mould and the cores are more and more subjected to deterioration (for the same number of moulded articles) and this results in destruction all the more quickly the higher the temperatures and working pressures employed.

This deterioration is especially marked at the bearing surfaces of the cores which slide into the housings reserved therefor in the body of the mould.

Fluid-tightness is rapidly destroyed; infiltration of the moulded material causes jamming, which becomes more serious with each operation, or else the wear which is produced prevents the core from being positioned accurately and results in rejects.

The objects of the invention is to obviate these disadvantages and the invention consists essentially in the following arrangements which may be used simultaneously or otherwise according to the form of the parts which are to be produced and the materials employed.

(1) The bearing surface or surfaces of the core by which the latter is supported in the walls of the mould are constituted by conical surfaces whose direction curves at the inner side of the mould correspond to the contour of the recess to be formed, or to a circle circumscribed about the said contour, the slope of the generatrices relatively to the direction of withdrawal of the core being within the range of 3 to 45°.

(2) This arrangement may advantageously be supplemented by a cylindrical surface arranged after the conical surface in the direction towards the inside of the mould, the said surface being of low height (a few millimetres) and leaving a small clearance (a few tenths of millimetres) between itself and the corresponding surface of the mould.

This feature makes it possible deliberately to form and cool a burr of limited dimensions which stops at the conical portion of the core in close contact with the corresponding part of the mould.

These arrangements eliminate any contact between mould and core whilst the core is being withdrawn and the bearing surfaces remain intact irrespective of the number of operations. Furthermore, the core is always perfectly positioned.

Constructional forms of the invention are illustrated by way of non-limitative examples in the accompanying drawings:

Fig. 1 is a view of a mould having a single core comprising two bearing surfaces;

Fig. 2 shows a mould whose core is formed of two opposite elements.

Referring now to the drawings, Fig. 1 shows a core 1 whose bearing surfaces 2 and 3 contacting the mould 4 are conical, the angle α of the generatices with the axis of the core being approximately 30°.

On the inner side, the cylindrical core is continued for a small distance at 5, 6 into the wall of the mould. The said wall comprises a corresponding cylindrical orifice which allows at 7 and 8 a small clearance for a few tenths as for example 0.5 of a millimetre between itself and the core, over a height of several millimetres (of the order of 1 to 5 mm.).

In Fig. 2, the core is formed of two parts 9 and 10, each of which has a conical bearing surface 11 and 12 respectively flaring in the direction of withdrawal and preceded by a cylindrical surface 13 or 14 which allows, between the core and the mould, a small clearance 15 or 16 which, as has been stated, permits of the deliberate formation and cooling of a burr which prevents any contact between the mould and the core whilst the latter is being withdrawn and, more particularly, contact with a sharp edge, which would take place if the conical parts of the mould and core extended as far as the inner face of the mould.

I claim:

1. In combination, a permanent mold for use in the casting of molten materials, the mold having a cavity and at least one core-positioning passage in communication with the outside of the mold and provided with surfaces defining a bore of the thickness of the mold providing communication between the passage and the cavity, a removable metal core of the type used repetitively in casting operations having at least one frusto-conical tapered guide portion seated within the passage and diverging in a direction corresponding to a direction of withdrawal of the core and having a body portion extending into the cavity and joining said guide portion at a point within said bore, the body portion having a substantially cylindrical configuration at least in an area adjacent the point of juncture of the body portion and said guide portion and extending axially along the core in a direction toward the cavity at least up to a point on the core corresponding to the end of said bore, said bore having a diameter larger than any transverse dimension of the core body portion and only slightly greater than the diameter of the cylindrical part of the core thereby forming a substantially annular and relatively narrow clearance space between the cylindrical part of the body portion of the core and the mold surfaces defining the bore, and said core-positioning passage having sloped surfaces registering with the frusto-conical guide portion of the core, whereby when a molten material is introduced into the mold the material in said narrow space cools more rapidly than the material in said cavity and provides a substantially rigidified annular slug of material tending to hold the core properly positioned in said passage during the introduction of molten material and allows removal of the core without contact of the mold surfaces by the body portion of said core.

2. In combination, a permanent mold for use in the casting of molten materials, the mold having a cavity and at least one core-positioning passage in communication with the outside of the mold and provided with surfaces defining a bore of the thickness of the mold providing communication between the passage and the cavity, a removable core of the type used repetitively in casting operations having at least one frusto-conical tapered guide portion seated within the passage and diverging in a direction corresponding to a direction of withdrawal of the core and having a body portion extending into the cavity and joining said guide portion at a point within said bore, said bore having a diameter larger than any transverse dimension of the core body portion and only slightly greater than the diameter of the part of the core in the bore thereby forming a relatively narrow clearance space between the part of the body portion of the core in the bore and the mold surfaces defining the bore, and said core-positioning passage having sloped surfaces registering with the frusto-conical guide portion of the core, whereby when a molten material is introduced into the mold the material in said narrow space cools more rapidly than the material in said cavity and provides a substantially rigidified slug of material tending to hold the core properly positioned in said passage during the introduction of molten material and allows removal of the core without contact of the mold surfaces by the body portion of said core.

3. In the combination according to claim 2, in which the length of the bore is not less than 1 millimeter and not over 5 millimeters.

4. In the combination according to claim 2, in which the width of said clearance space is substantially 0.5 millimeters.

5. In the combination according to claim 2, in which the core has a longitudinal axis corresponding to a central axis of the bore and passage of the mold, and in which the guide portion of the core has surfaces defining an angle of slope of not less than 3° and not over 45° between them and said longitudinal axis.

References Cited in the file of this patent

UNITED STATES PATENTS

| | | |
|---|---|---|
| 26,394 | Ellis | Dec. 6, 1859 |
| 137,133 | Gafney | Mar. 25, 1873 |
| 2,004,378 | McMullen | June 11, 1935 |
| 2,134,829 | McWane | Nov. 1, 1938 |
| 2,161,522 | McWane | June 6, 1939 |
| 2,173,955 | Zahn | Sept. 26, 1939 |
| 2,315,071 | McWane | Mar. 30, 1943 |

OTHER REFERENCES

Foundry Practice, R. H. Palmer, p. 380 John Wiley & Son, 3rd ed. 1926.